(12) United States Patent
DiLullo et al.

(10) Patent No.: US 9,696,617 B2
(45) Date of Patent: Jul. 4, 2017

(54) SCREEN VIBRATION FOR REDUCING SPECKLE

(71) Applicant: RealD Inc., Beverly Hills, CA (US)

(72) Inventors: Mark DiLullo, Boulder, CO (US);
Kevin Curtis, Boulder, CO (US);
Douglas J. McKnight, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/847,991

(22) Filed: Sep. 8, 2015

(65) Prior Publication Data

US 2016/0139496 A1     May 19, 2016

Related U.S. Application Data

(60) Provisional application No. 62/047,465, filed on Sep. 8, 2014.

(51) Int. Cl.
    *G03B 21/56*       (2006.01)
    *G02B 27/48*       (2006.01)

(52) U.S. Cl.
    CPC .......... *G03B 21/562* (2013.01); *G02B 27/48* (2013.01)

(58) Field of Classification Search
    USPC ....................................................... 359/446
    See application file for complete search history.

(56) References Cited

U.S. PATENT DOCUMENTS 3,125,927 A * 3/1964 Erban .................. G03B 21/562
                                                                                 101/127.1
4,035,068 A     7/1977 Rawson
(Continued)

FOREIGN PATENT DOCUMENTS

EP        1260850 B1     11/2005
JP     2007-316400 A     12/2007

OTHER PUBLICATIONS

International search report and written opinion of international searching authority in co-pending PCT/US2015/049016, dated Dec. 21, 2015.
(Continued)

*Primary Examiner* — Clayton E Laballe
*Assistant Examiner* — Linda B Smith
(74) *Attorney, Agent, or Firm* — Penny L. Lowry; Neil G. Mothew

(57) ABSTRACT

The present disclosure provides discussion of screen vibration to reduce speckle in display applications and/or projection screens. Electrical transducers or reactors may be used with a screen to reduce or remove speckle in projection screens and/or display applications. Electrical transducers may not be directly mounted to a screen, thus eliminating many mechanical failure modes associated with a vibrating transducer as well as resulting in a much quieter operation. By design, the reactors or transducers may actually contact the screen, and can take up less than one square inch of screen surface each, than previous designs, which may be outside of the active viewing area and within 12 inches of the screen border, preferably less than approximately 1 inch from screen edge. The reactors are magnets, though any ferrous material can be made to work with certain operating conditions.

22 Claims, 14 Drawing Sheets

(56) References Cited

U.S. PATENT DOCUMENTS

| | | | |
|---|---|---|---|
| 4,155,630 A | 5/1979 | Ih | |
| 4,360,372 A | 11/1982 | Maciejko | |
| 5,272,473 A * | 12/1993 | Thompson | G09F 19/18 |
| | | | 345/7 |
| 5,313,479 A | 5/1994 | Florence | |
| 6,122,023 A | 9/2000 | Chen et al. | |
| 6,594,090 B2 | 7/2003 | Kruschwitz et al. | |
| 6,844,970 B2 | 1/2005 | Olczak | |
| 6,895,149 B1 | 5/2005 | Jacob et al. | |
| 7,199,933 B2 | 4/2007 | Yavid et al. | |
| 7,244,028 B2 | 7/2007 | Govorkov et al. | |
| 7,342,719 B1 | 3/2008 | Kalmanash et al. | |
| 7,379,651 B2 | 5/2008 | Abu-ageel | |
| 7,489,714 B2 | 2/2009 | Park et al. | |
| 7,527,384 B2 | 5/2009 | Kim et al. | |
| 7,585,078 B2 | 9/2009 | Kim et al. | |
| 7,593,159 B2 * | 9/2009 | Yokoyama | G02B 27/48 |
| | | | 359/446 |
| 7,719,738 B2 | 5/2010 | Abu-ageel | |
| 7,922,333 B2 | 4/2011 | Akahane et al. | |
| 8,072,681 B2 | 12/2011 | Coleman et al. | |
| 8,194,315 B2 | 6/2012 | Sharp et al. | |
| 9,030,726 B2 * | 5/2015 | Griswold | G02F 1/1347 |
| | | | 359/285 |
| 2003/0003879 A1 * | 1/2003 | Saiki | H04M 1/03 |
| | | | 455/575.1 |
| 2005/0008290 A1 | 1/2005 | Miron | |
| 2005/0195508 A1 | 9/2005 | Ji et al. | |
| 2009/0168025 A1 | 7/2009 | Domm | |
| 2009/0295975 A1 * | 12/2009 | Takahashi | H04N 5/23293 |
| | | | 348/333.01 |
| 2010/0053476 A1 | 3/2010 | Maxson | |
| 2010/0079848 A1 | 4/2010 | Grasser et al. | |
| 2010/0118397 A1 | 5/2010 | Powell et al. | |
| 2010/0296064 A1 | 11/2010 | Silverstein et al. | |
| 2010/0296065 A1 | 11/2010 | Silverstein et al. | |
| 2011/0102748 A1 | 5/2011 | Shevlin et al. | |
| 2012/0019918 A1 | 1/2012 | Dunphy et al. | |
| 2014/0247484 A1 | 9/2014 | Curtis et al. | |
| 2014/0268339 A1 * | 9/2014 | Pekarek | G02B 27/64 |
| | | | 359/554 |
| 2014/0362437 A1 * | 12/2014 | McKnight | G03B 21/562 |
| | | | 359/446 |
| 2016/0103388 A1 * | 4/2016 | Herati | G03B 21/562 |
| | | | 359/446 |

OTHER PUBLICATIONS

First Office Action in corresponding Korean patent application No. 10-2017-7009402, mailed Apr. 26, 2017.

* cited by examiner

SCREEN VIBRATION FOR REDUCING SPECKLE

CROSS-REFERENCE TO RELATED APPLICATIONS

This application is related to U.S. Pat. No. 8,724,218, "Speckle reduction using screen vibration techniques and apparatus," filed Jul. 9, 2012, U.S. patent application Ser. No. 13/544,959, "Despeckling devices and methods," filed Jul. 9, 2012, U.S. patent application Ser. No. 14/298,633, "System and method for vibrating screens to reduce speckle," filed Jun. 6, 2014, all of which are herein incorporated by reference in their entireties. Additionally, this application is related to and claims priority to U.S. Provisional Patent Application No. 62/047,465, "Screen vibration for reducing speckle," filed Sep. 8, 2014 which is herein incorporated by reference in its entirety.

TECHNICAL FIELD

This disclosure generally relates to systems and methods for reducing speckle on projection screens and substrates using vibration.

BACKGROUND

The use of coherent or partially coherent sources can have advantages in display or illumination over standard incoherent sources (lamps) in that they can achieve higher brightness, better reliability, and larger color gamut. However, with this partial coherence comes the issue of speckle. Speckle is due to interference of the light on the screen or target that causes variations in intensity that can be seen by the observer or an instrument. These typically high frequency intensity variations are very undesirable for display or imaging applications.

BRIEF SUMMARY

According to a first aspect of the present disclosure, a method for reducing speckle on a projection screen may include locating a transducer near a projection screen, and attaching a first reactor to the projection screen and proximate to the transducer so that the first reactor is operable to vibrate the projection screen to reduce speckle in a viewing area of the projection screen. A second reactor may be attached to the first reactor. A transducer may be located near the projection screen and may be attached to a rigid structure. The transducer may be attached to a rigid structure which may be a projection screen frame, the floor, the wall, and so forth. The transducer may be driven with an alternating current. The transducer may impart motion to the reactor and cause the projection screen to vibrate such that the range of screen motion out of the screen plane approximately at the transducer is in the approximate range of 3-10 millimeters. Additionally, the transducer should exhibit less than approximately ⅛ inch motion in any direction when driving the first reactor. A mounting patch may be attached close to at least one edge of the projection screen, in which the first reactor may be located in a reactor position locator in the mounting patch.

According to another aspect of the present disclosure, a vibration system for a projection screen may include an electromagnet assembly operable to induce movement in a first reactor, wherein the first reactor is adjacent to a screen support patch, further wherein the screen support patch is adjacent to a projection screen, and the screen support patch may have a reactor position locator for locating the first reactor. The reactor position locator may be a hole, or any other shape that is suitable for locating the reactor. Further, the reactor position locator may not be punched all the way through the screen support patch, but may just be a notch. The electromagnet and the first reactor may be located at least at the bottom edge of the projection screen, and the electromagnet and the first reactor may be located in the approximate range of 0.01-5 inches from each other. A second reactor may be located adjacent to the first reactor, and the first and second reactors may attach to one another through the reactor position locator in the screen support patch. The first reactor may be a magnet, or the second reactor may be a magnet, or both of the first and second reactors may be magnets. The magnet may be a neodymium magnet rated in the approximate grade range of N40-N52, or more specifically may be a neodymium magnet rated at approximately grade N45.

Additionally, the first reactor may be a ferrous material, or the second reactor may be a ferrous material, or both of the first and second reactors may be ferrous materials. The first reactor may be located in the approximate range of 0.01 inches to 2 inches from the edge of the projection screen and the electromagnet assembly may be located in the approximate range of 0.01 inches to 2 inches from the edge of the projection screen. The electromagnet assembly may be a rigid armature that may at least partially encase the electromagnet.

Continuing the discussion of this aspect, at least one edge of the screen support patch may be approximately aligned with at least one edge of the projection screen and the screen support path may include at least one connection hole located beyond the edge of the screen.

According to yet another aspect of the present disclosure, a method for reducing speckle on a projection screen may include employing a transducer near a projection screen, driving the transducer with an alternating current signal, and vibrating the projection screen substrate with a ferrous material that is driven by the transducer to reduce speckle in the viewing are of the projection screen.

According to yet another aspect of the present disclosure, a method for reducing speckle on a projection screen may include locating a transducer near a projection screen and attaching a first reactor to the projection screen and proximate to the transducer so that the first reactor may be operable to vibrate the projection screen to reduce speckle in a viewing area of the projection screen.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
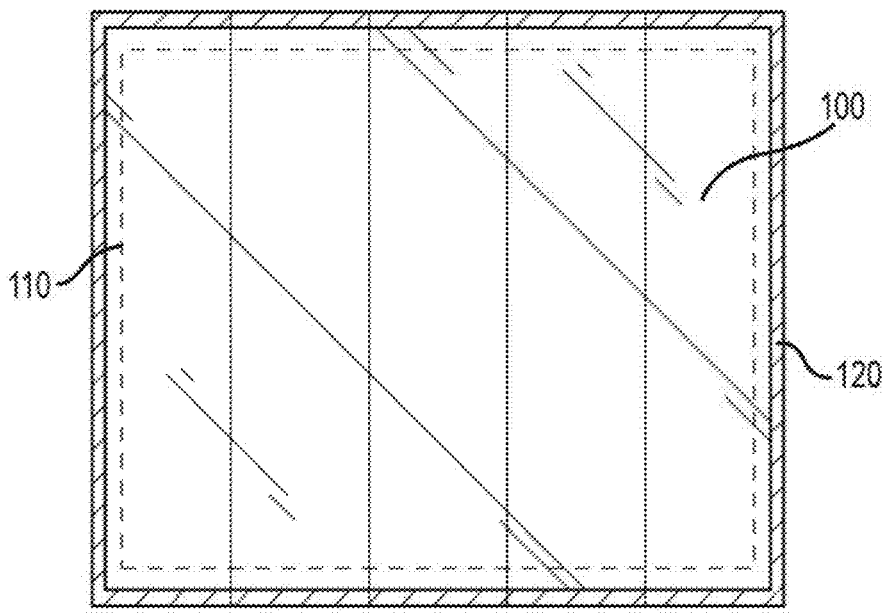
FIG. 1 is a schematic diagram illustrating potential locations for mounting reactors and/or transducers to a screen, in accordance with the present disclosure.

There are various known techniques for addressing high frequency intensity variations. How to measure and characterize speckle is also well known. Speckle is measured by measuring the contrast of the light intensity. This is defined as the standard deviation over the mean of the intensity. For how to measure speckle, See Jacques Gollier, *Speckle Measurement Procedure*, Conference Projector Summit 2010, Las Vegas Nev., May 7, 2010, herein incorporated by reference.

Some currently known techniques to reduce speckle include a first family of techniques to reduce speckle that involves using moving diffusers (one or many) to achieve changes to the phase locally to temporally average out some of the speckle over the observer's/detector's integration period. See, e.g., U.S. Pat. No. 5,313,479, entitled "Speckle-free display system using coherent light," U.S. Pat. No. 4,035,068, "Speckle minimization in projection displays by reduced spatial coherence of the image light", and U.S. Pat. No. 7,585,078, "Illumination system capable of eliminating laser speckle and projection system employing the same," all of which are herein incorporated by reference. The diffusers can also be vibrating with an amplitude that is large enough to cover several diffractive elements to achieve some averaging as well. See U.S. Pat. No. 7,922,333, entitled "Projector, screen, projector system, and scintillation removing apparatus for removing scintillation on an image," herein incorporated by reference.

A second family of techniques to reduce speckle involves using moving mirrors or phase modulators to achieve the temporal averaging. See, e.g., U.S. Published Patent Application No. 2011/0102748, entitled "Optical system and method," and U.S. Published Patent Application No. 2010/0053476, entitled "Systems and methods for despeckling a laser light source," U.S. Pat. No. 4,155,630, entitled "Speckle elimination by random spatial phase modulation," and U.S. Pat. No. 7,489,714, entitled "Speckle reduction laser and laser display apparatus having the same," all herein incorporated by reference in their entireties. Generally, a disadvantage of this family of techniques includes the use of expensive moving parts or phase modulators.

A third family of techniques to reduce speckle involves using a large core, long, very high numerical aperture (NA) multimode fiber to "decoher" a laser beam. See, e.g., U.S. Published Patent Application No. 2009/0168025, entitled "Decohered laser light production system," (herein incorporated by reference), which discusses the use of a 12 mm diameter core fiber with an NA of 0.65. This large fiber may provide some reduction in speckle but deleteriously destroys the brightness of the system since the etendue is so very large. Similarly, using a very long multimode fiber can have some benefits. For instance, see U.S. Published Patent Application No. 2010/0079848, "Speckle reduction in display systems that employ coherent light sources" but reduces the power with absorption. However, multimode fiber speckle issues and solutions seems to be well known in the field. See, e.g., Joseph Goodman, *Speckle Phenomena in Optics*, Ch. 7 (Roberts and Company 2006). All references cited in this paragraph are herein incorporated by reference.

A fourth family of techniques has been proposed that involve dividing the beam up into parts, and then forcing each part to have different path lengths or changes of polarization before recombining the beams. Examples using fiber bundles or splitter/combiners or lenslet arrays include: U.S. Published Patent Application No. 2005/0008290 "Static method for laser speckle reduction and apparatus for reducing speckle;" U.S. Pat. No. 4,360,372, "Fiber optic element for reducing speckle noise;" U.S. Pat. No. 6,895,149, entitled "Apparatus for beam homogenization and speckle reduction;" U.S. Pat. No. 7,379,651, entitled "Method and apparatus for reducing laser speckle;" U.S. Pat. No. 7,527,384, entitled "Illumination system to eliminate laser speckle and projection system employing the same;" U.S. Pat. No. 7,719,738, entitled "Method and apparatus for reducing laser speckle." U.S. Pat. No. 6,594,090, entitled "Laser projection display system," which uses a lenslet integrator in conjunction with a moving diffuser to reduce speckle, states that the integrator makes the diffuser more effective. Some published applications disclose the use of a moving lenslet array instead of a diffuser to reduce speckle. See, e.g., U.S. Published Patent Application No. 2010/0296065, entitled "Out-of-plane motion of speckle reduction element," and U.S. Published Patent Application No. 2010/0296064, entitled "Projection with lenslet arrangement on speck reduction element." These teachings use expensive fiber bundles or lens arrays or many fiber coupler/splitters to achieve some reduction in speckle. All references cited in this paragraph are herein incorporated by reference.

Another family of solutions exist utilizing sources with larger spectral bandwidths. This can be achieved by chirping the drive current, using several lasers of different wavelengths or other means.

Moving the screen is also a potential solution to the undesirable problem of speckle. In chapter six of the book "Speckle Phenomena in Optics", supra, the linear shift rate of the screen in x or y or screen rotation (these motions are the plane of the screen which is roughly normal to the projection) is calculated in order to average out some of the speckle during the observer's/detector's time integration period. By moving it, the light hits different parts of the screen which then changes the speckle pattern. If this is done fast relative to the detector's integration period (for example, the eye is roughly 20 Hz) then the detector may see an average of several speckle patterns, which results in a lower speckle contrast. In U.S. Pat. No. 5,272,473, entitled "Reduced-speckle display system," the use of a transducer attached directly to the screen to mechanically generate surface acoustic waves to minimize speckle is taught. U.S. Pat. No. 6,122,023, entitled "Non-speckle liquid crystal projection display" teaches the use of a highly scattering liquid crystal as a screen, and then electrically changing the liquid crystal states to alleviate speckle. Other teachings have used scattering liquids or diffuser cells as screens to improve speckle. See, e.g., U.S. Pat. No. 6,844,970, entitled "Projection television set, screens, and method;" U.S. Pat. No. 7,199,933, "Image projection screen with reduced speckle noise;" U.S. Pat. No. 7,244,028, "Laser illuminated projection displays", U.S. Pat. No. 7,342,719, "Projection screen with reduced speckle," and U.S. Published Patent Application No. 2010/0118397, "Reduced laser speckle projection screen." All references cited in this paragraph are herein incorporated by reference.

In practice, it is common to use a few of the techniques together in order to reduce speckle to a significant level. All of these involve using many other additional parts and/or motion to achieve some reduction on speckle. These additional parts increase cost, decrease brightness, and reduce reliability.

The present disclosure provides discussion of screen vibration to reduce speckle in display applications. Typically movie screens may include a polymer substrate, usually poly-vinyl-chloride (PVC) roll stock, that is perforated for acoustic transmission and then seamed together to make a screen of the desired size. These screens are typically in the approximate range of 0.1-0.8 mm thick, heavily plasticized, and embossed with a matte texture. This type of screen may then be sprayed with a polarization preserving coating to produce a polarization preserving screen. The conventional coating includes some sort of metal pieces or bits, for example ball-milled aluminum powder, encased in a polymer binder. These screens are relatively heavy and have a low Young's modulus, typically in the approximate range of 40-60 MPa.

Significant optical performance improvements can be realized by utilizing a metalized embossed surface as generally described in U.S. Pat. No. 8,072,681, which is herein incorporated by reference in its entirety. For proper fidelity, a more rigid substrate such as PET, polyester or polycarbonate (PC) may be used. A hybrid approach is to use the embossed surface to form textured metal flake as generally discussed in commonly owned U.S. Pat. No. 8,169,699, which is herein incorporated by reference in its entirety or to physically chop the metalized substrate as described in commonly owned U.S. Pat. No. 8,194,315, which is herein incorporated by reference in its entirety, either of which could then be utilized to replace the polymer binder with metal bits that is used in a conventional screen system. These more rigid substrates, and therefore the screen, are much lighter and have a higher elastic modulus than conventional PVC and these screens may be referred to herein as engineered screens. Rear-projection polarization preserving screens typically may include a diffusely scattering transparent polymer substrate, an embossed transparent substrate, or a combination of the two.

The embodiments discussed herein can be used with a wide variety of screen materials with an approximate moduli range from 10 Mpa to 10 Gpa, though better results may be achieved using higher-modulus materials above approximately 500 MPa, as the higher elastic modulus materials may propagate vibrations more effectively through the material. The method and materials used to apply optical coatings to the screen substrate can influence the effective modulus of the complete screen, though the primary influencer of effective screen modulus is the substrate. Screen perforation also effects modulus with holes decreasing the modulus of the screen. The larger area lost to holes having a larger effect on modulus. The preferred use is with higher modulus substrates with mini, micro or no perforations. This embodiment has been designed to work effectively when optical surfaces are sprayed, painted, printed, imprinted or cast onto the substrate and include conventional metal flake and most other optical coatings.

In addition, screens are commonly perforated to allow for sound to pass through the screen as some of the speakers are commonly placed behind the screen. Movie theaters typically use mechanically perforated screens with holes in the range of 1-5 mm and total hole area of 3-7%. High modulus screens can be micro-perforated with holes in the approximate range of 60-400 um, and total hole areas in the approximate range of 0.2-2%, as generally discussed in U.S. patent application Ser. No. 13/76,092, "Light efficient acoustically transmissive front projection screens," filed Mar. 5, 2013, which is herein incorporated by reference in its entirety. Some vendors use a mini-perforation which is somewhere between mechanical and micro perforation in hole size and area (0.5-2 mm and 1-3% area). Some screens may not be perforated. The embodiment can be used with screens that are mechanically perforated, perforated, microperforated or not perforated. The preferred use is with higher modulus substrates with mini, micro or no perforations. The transducer described below vibrates the screen. This vibration can partially exist as surface acoustic waves, traveling waves on the surface. Perforations have a larger negative effect on screen vibration than what is caused by simple changes in modulus, as they may damp the vibrations as the waves propagate through the screen substrate. This might be caused in part by local changes in impedance for the surface waves that cause greater attenuation per unit length in the screen. From a vibrational standpoint, it can be more beneficial to eliminate or reduce perforation size than to increase the modulus of the screen material.

In addition to use with laser projection, vibration of the screen has been experimentally shown to reduce speckle for standard projection lamps, so this embodiment can be useful with lamp based projection as well. Traditional screens may typically have a vibration device or transducer attached to the backside of the screen or in contact with the backside of the screen inside the image area or viewing area. In fact, large cinema screens may employ an array of transducers spaced across the entire area of the screen in order to successfully vibrate the screen. The spacing of the transducer array may be 2-15 ft. between transducers in both x and y direction of the screen. The disadvantage may be visibility of the transducer to the viewer and the quantity of transducers may introduce significantly more potential system failure points. However, the close spacing may be attributed to the mechanical properties of traditional screens. Typical vibration frequencies may be in an approximate range from 10-80 Hz. Higher frequencies typically do not travel well in these substrates. These lower frequencies and any low beat frequencies are more likely to be noticed by the viewers as frequencies below approximately 20-30 Hz are detectable by eye.

Screen tension is an important variable in the effectiveness of this embodiment. Tension applied to screen edges using springs, rigid connections, or other means varies hugely between screen types and even from one hanging screen to an identical hanging screen. Tension levels may be in the approximate range from 0-50 lb/ft. This measure indicates the amount of tension applied to the screen edge, in pounds, for every linear foot of screen edge. Continuing the discussion of this embodiment, should the screen tension be too low, the entire screen may visibly translate large visible ripples within its frame or large visible ripples may be seen propagating across the screen surface. Excessively high screen tension may prevent vibrations from propagating and cause the despeckling effects to be localized to regions near transducers or not visible at all.

A key aspect, and substantial improvement is that the electrical transducer does not have to be mounted to the screen at all, eliminating many mechanical failure modes associated with a vibrating transducer as well as resulting in much quieter operation. By design, the reactors may actually contact the screen, and can take up less than one square inch of screen surface each, which may be outside of the active viewing area and within 12 inches of the screen border, may be less than approximately 2 inches from screen edge, and preferably 0.1 inches from the screen edge as measured between the bottom of the magnet and the screen edge. In this embodiment, the reactors are magnets, though any ferrous material can be made to work with certain operating conditions. The terms magnet and reactor may be used interchangeably herein. Further, the terms electrical transducer, transducer, and electromagnet may also be used interchangeably herein. Each reactor can take up to 7 square inches or less than 0.5 square inches of screen space. FIG. 1 is a schematic diagram illustrating potential locations for mounting reactors and/or transducers to a screen. The transducers can be mounted behind masking, for example, so that the vibration system is not visible from a viewer perspective.

FIG. 1 is one possible embodiment of a screen system. In this screen system example of FIG. 1, the screen 100 includes a representation of a typical viewing area 100 and also possible magnet mounting locations 120.

Figure 2:
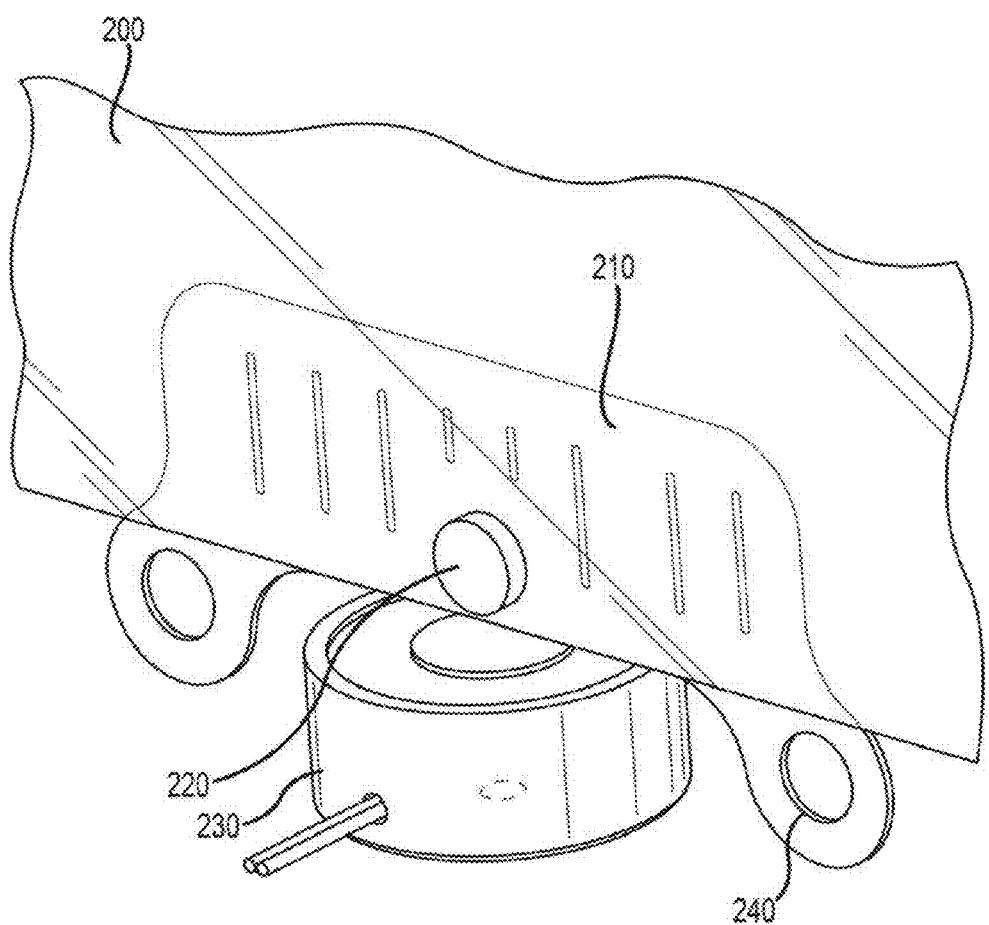
FIG. 2 is a schematic diagram illustrating a front view of an electromagnet transducer assembly, in accordance with the present disclosure.
Figure 3:
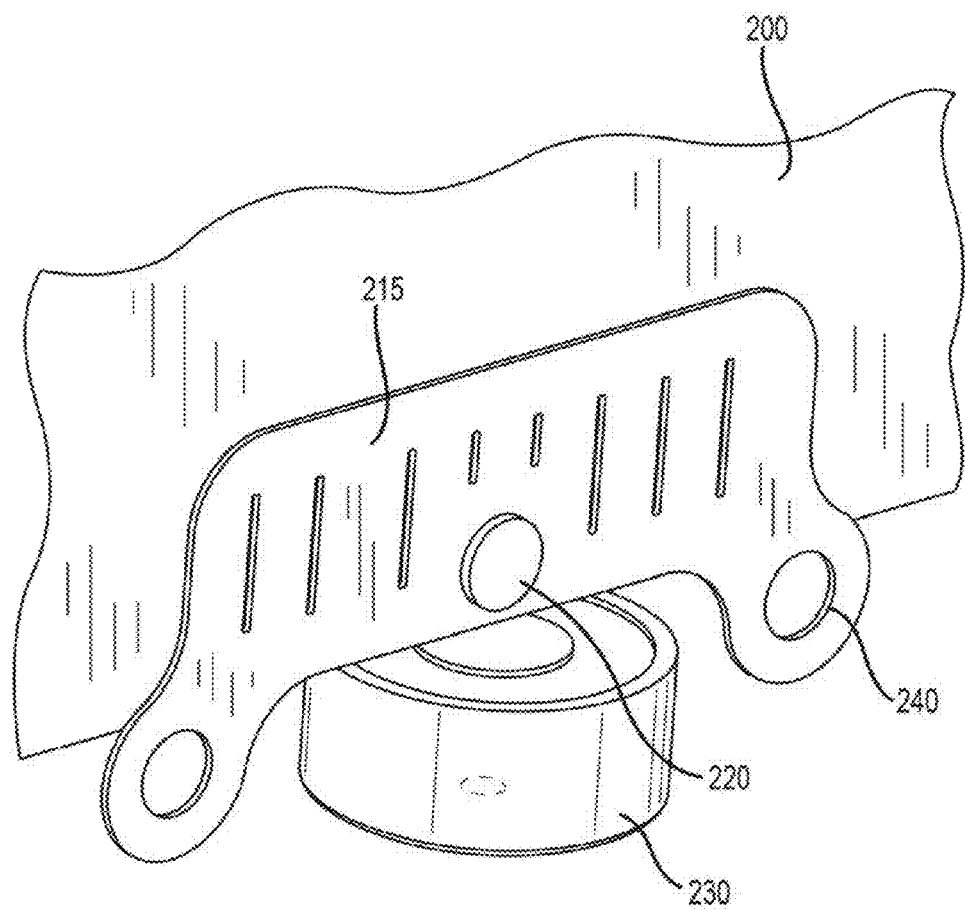
FIG. 3 is a schematic diagram illustrating a rear view of electromagnet transducer, in accordance with the present disclosure.
Figure 4:
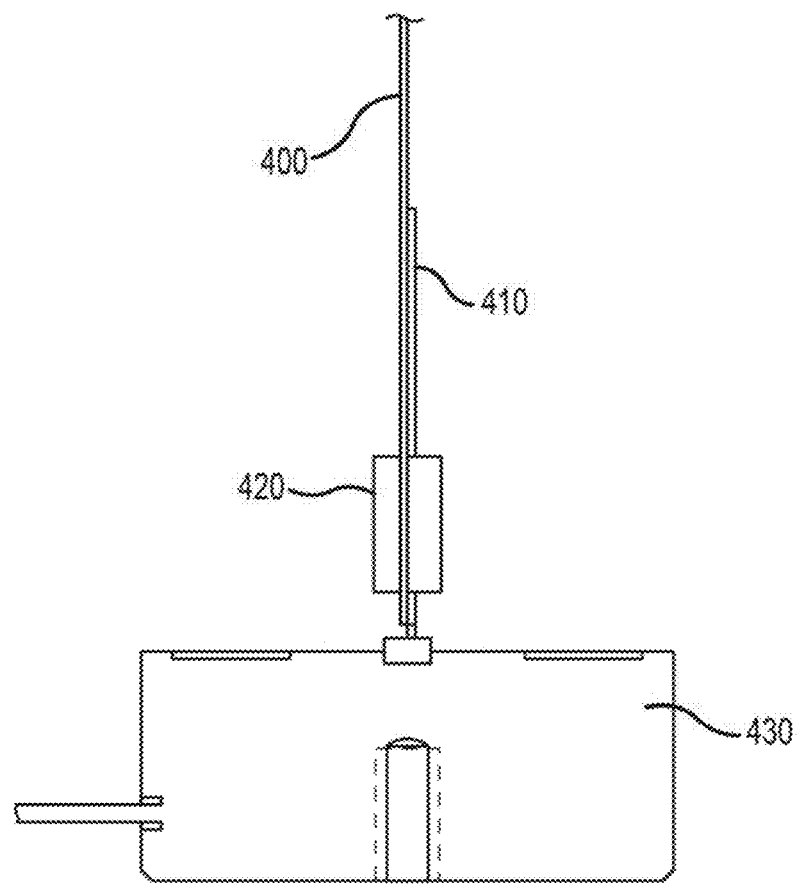
FIG. 4 is a schematic diagram illustrating a cross-section view of a transducer, in accordance with the present disclosure.

The motion inducing transducer is an electromagnet which may be preferably rigidly attached to the screen frame and may not be in direct contact with the screen. The electromagnet induces motion in the magnet assembly or reactor which is attached to the screen, producing non-contact vibrational motion in the screen as illustrated in FIGS. 2-4. Non-contact vibrational motion may be used to describe the embodiment in which the electromagnet and the reactors may not be in direct contact with one another.

Figure 5:
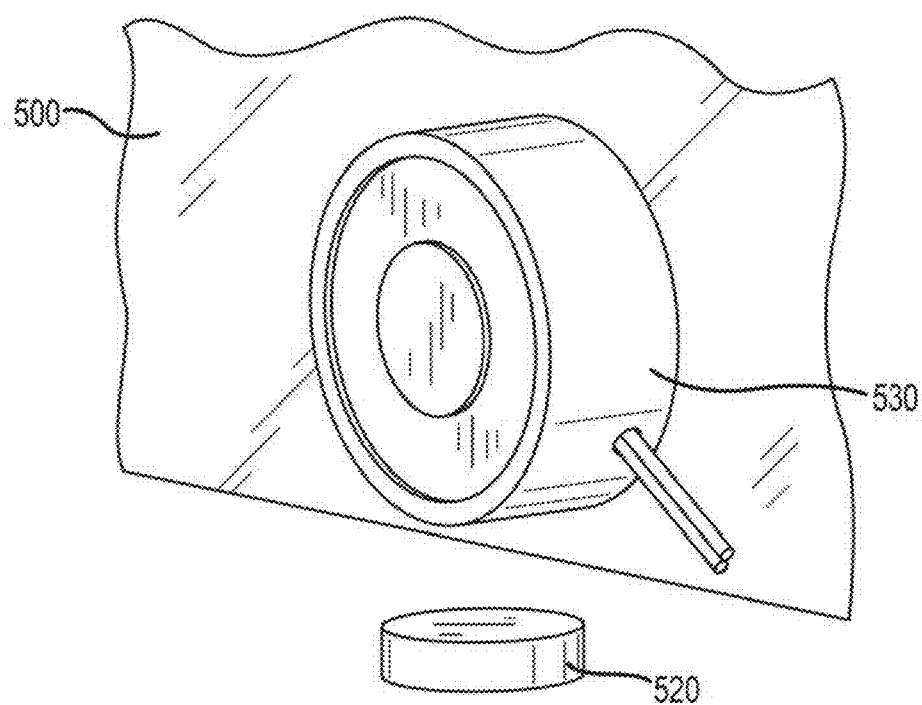
FIG. 5 is a schematic diagram illustrating another configuration with an electromagnet mounted to a screen, in accordance with the present disclosure.

Alternatively, this same concept may be used where the electromagnet(s) are mounted to the screen and interact with reactors rigidly attached to the screen frame, and may again provide non-contact vibrational motion. FIG. 5 demonstrates this configuration using one electromagnet and one reactor, though two or more of each could be employed to increase vibrational input to the screen. In a variant of the configuration which uses electromagnets mounted to the screen, ferrous parts of the existing screen frame may be used as the reactor, reducing component count and simplifying design. An optional screen support can be employed, as illustrated in FIG. 2, to offer various improvements discussed herein.

FIG. 2 is a schematic diagram illustrating a front view of an electromagnet transducer assembly. Additionally, FIG. 2 illustrates a screen 200, a screen support 210, a reactor 220, an electromagnet 230, and a tensioning connection 240. The screen support 210 may also be referred to herein as a mounting patch. The screen support 210 may be attached to the screen 200 and may also include a tensioning connection 240. The tensioning connection 240 may be used to place the screen 200 under tension by connecting springs, cords, and so forth from the tensioning connection 240 to a screen frame (not shown).

FIG. 2 shows the screen support 210 with an attached reactor 220. The screen support 210 may include a hole that the reactor 220 fits into. The screen support 210 can be glued or mounted to the screen in any appropriate manner. The screen may then be adjusted by attaching one end of a holder, such as a spring or a cord, to the tensioning connections 240 and the other end of the holder to the screen frame, wall, ceiling, or floor. The electromagnet 230 may be located close to the reactor 220 by the screen edge, and connected electrically to the drive electronics. The electromagnet and the reactor may be spaced from one another in the approximate range of 0.01 inches to 5 inches.

FIG. 3 is a schematic diagram illustrating a rear view of the electromagnet transducer of FIG. 2. FIG. 3 shows the back side of screen or the opposite side of the viewed screen surface. In this example, both sides of the screen have screen supports attached to the screen to help maintain reactors position and help produce the correct screen tension to eliminate excess screen motion and improve the frequency response of the system.

In one embodiment, the projection screen may be approximately 10 feet high and approximately 20 feet wide. There may be one vibration assembly located approximately in the bottom edge of the screen, roughly centered width wise on the screen. The projection screen and screen support patches may be PC or PET, or any other appropriate material.

In another embodiment, the projection screen may be approximately 18 feet high and approximately 44 feet wide. There may be two vibration assemblies located approximately one third and two thirds of the way across the bottom edge of the screen, and an additional vibration assembly located centered width wise on the top of the screen. All the vibration assemblies may be located approximately on the edges of the projection screen. The projection screen and screen support patches may be PC or PET, or any other appropriate material Similar to FIG. 2, FIG. 3 illustrates the back side of a screen 200, a screen support 215, a reactor 220, an electromagnet 230, and a tensioning connection 245. The screen support 215 may be placed in approximately the same location as the screen support 210 that is located on the front side of the screen 200.

FIG. 4 is a schematic diagram illustrating a cross-section view of a transducer and screen system. Additionally, FIG. 4 includes a screen 400, a screen support 410, reactors 420, and an electromagnet 430. The screen support 410 may be the same material as the screen 400 or may be a different material than the screen 400. The screen supports may be generally discussed in commonly owned U.S. patent application Ser. No. 14/619,719, "Strain relieved mounting method and apparatus for screen material," filed Feb. 11, 2015 and U.S. patent application Ser. No. 14/020,654, "High elastic modulus projection screen substrates," filed Sep. 6, 2013, both of which are herein incorporated by reference in their entireties. Also, depicted in FIG. 4 are two reactors 420. One reactor 420 may be located on the front side of the screen or viewing side of the screen and another reactor 420 may be located on the back side of the screen, or the opposite side of the viewing side of the screen. Although the magnets and reactors have been depicted as circular, the magnets and reactors may be any appropriate shape including square, rectangles, ovals, triangles, trapezoids, and so forth.

In FIG. 4, the cross section side view is an illustration of a transducer 430 in a preferred orientation and shows a cross section of the components. There are two reactors 430 shown in this example, one on each side of the screen and the electromagnet 430, as depicted, may be located beneath the reactors and the screen. Preferably the screen is centered or approximately centered on the electromagnet or vice versa. The electromagnet and the reactor may also be centered with one another. The screen, the electromagnet, and the reactor may all be centered with one another, or any combination thereof. Additionally springs or other support can be used or limit the displacement of the screen, and accordingly, the reactors, if the tension of the screen is not initially adequate to allow appropriate propagation of the vibration through the screen from the reactors or transducers.

FIG. 5 is a schematic diagram illustrating another configuration with an electromagnet mounted to a screen. Further, FIG. 5 shows a configuration in which the electromagnet or electromagnets are attached to the screen and a magnet is placed underneath the screen and attached to the frame or the wall, ceiling, or floor. FIG. 5 may include a screen 500, a reactor 520, and an electromagnet 530. The electromagnets are typically heavier than reactor. Additionally, the electromagnets may have wires attached as such it may improve performance if the electromagnets are stationary and located beneath the reactor(s), while the reactor is attached to the screen, which may allow the screen to vibrate.

Figure 6:
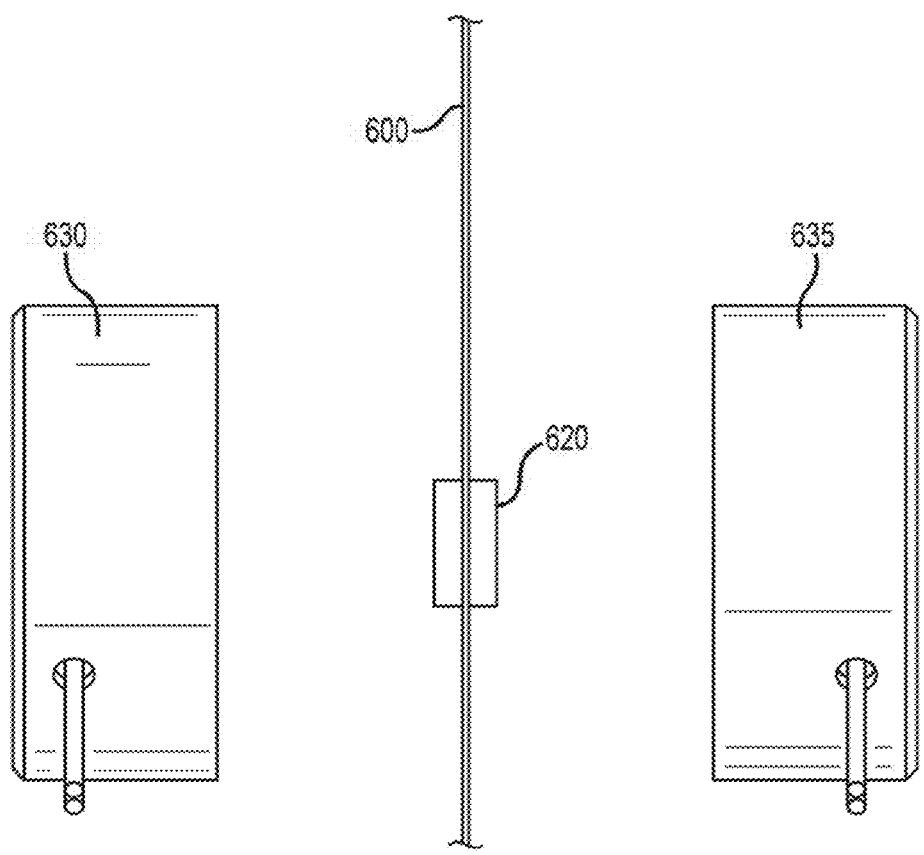
FIG. 6 is a schematic diagram illustrating another configuration with electromagnets, in accordance with the present disclosure.

Another configuration includes electromagnets which may be approximately axially aligned with the ferrous or nonferrous reactor(s), as depicted in FIG. 6. FIG. 6 is a schematic diagram illustrating another side view configuration with electromagnets. FIG. 6 may include a screen 600, reactors 620, an electromagnet 630, and an electromagnet 635. The reactors 620 may be attached to the front and the back sides of the screen 600. The electromagnets may be held in place with a bracket (not shown) that may be attached to the screen frame or any other rigid structure.

In this configuration, the electromagnets 630 and 635 are approximately axially aligned with each other and the reactors 620. The electromagnets may be spaced apart from the reactors by the same distance in an approximately symmetric configuration. The electromagnets may also be spaced different distances from the reactors with respect to the edge of the screen in an asymmetric configuration. Also, the electromagnets may be misaligned vertically and in opposite directions from the reactors. Although the electromagnets may be different distances from the reactors, the performance may increase in a symmetric configuration. Stated differently, the performance of the system will decrease as misalignment increases of the electromagnets.

Further, FIG. 6 depicts a configuration in which the front faces of two electromagnets 630, 635 may be approximately opposed to one another. In this example, the electromagnets 630, 635 should be driven with opposing, or at least different, signals such that they do not oppose one another and eliminate screen motion. All components of the assembly may be reasonably aligned such that they are all centered upon a common axis. Proper alignment facilitates maximum effectiveness, though some misalignment between elements may be acceptable. The configuration described above can be simplified to work with one electromagnet and one reactor although some form of fixturing including a spring, foam, elastomer, or other device is suggested in order to limit screen vibration amplitude. In this example, the spring or other device may be attached between the reactor and the electromagnets the magnitude of the vibration may be too large otherwise. As with the other configurations, another embodiment may be to mount the electromagnet directly to the screen and rigidly mount a ferrous reactor in a nearby location or utilize a ferrous member of the screen frame. Ferrous members may be any material that may react to the force of the electromagnet.

Magnets are used as reactors in the aforementioned configurations to increase the force of the electromagnet. Other ferrous materials could also be used as substitutes for magnets. Ferrous reactors or ferrous members may include the materials of steel, mild steel, cast iron, and so forth. Using a magnet as a reactor may provide an added benefit as it may eliminate the need for using adhesives to mount equipment to the screen, which may be appropriate if using ferrous, though nonmagnetized reactors. Spacing between elements in this embodiment may become much more critical with the exclusion of magnetized reactors as the magnetic interaction between the electromagnet and the nonmagnetized reactor may be substantially weaker.

For simplicity in this document, the assembly of the electromagnet, high strength magnets, plastic screen support patches, and fixturing hardware may be referred to as the vibration assembly. For example, a high strength neodymium magnet may be in the approximate range of N40-N52. The screen support patch as shown in FIGS. 2-4 and in FIG. 7 below may be made of many materials. A preferred material given the design specification is polycarbonate, given its light weight and good rigidity. The materials and specifications for the screen supports or patches is generally discussed in commonly owned U.S. patent application Ser. No. 14/619,719, "Strain relieved mounting method and apparatus for screen material," filed Feb. 11, 2015 and U.S. patent application Ser. No. 14/020,654, "High elastic modulus projection screen substrates," filed Sep. 6, 2013, both of which are herein incorporated by reference in their entireties. It is possible to attach magnets without using screen supports or mounting patches. The magnets can also be glued directly to the screen or placed into a housing and then the housing may be clamped or glued to the screen. A clam shell like housing, for example, can clamp to the screen and hold the magnets in place. If the magnets are strong enough they may not need to be held in place with anything other than the magnetic attraction between the two magnets.

Figure 7:
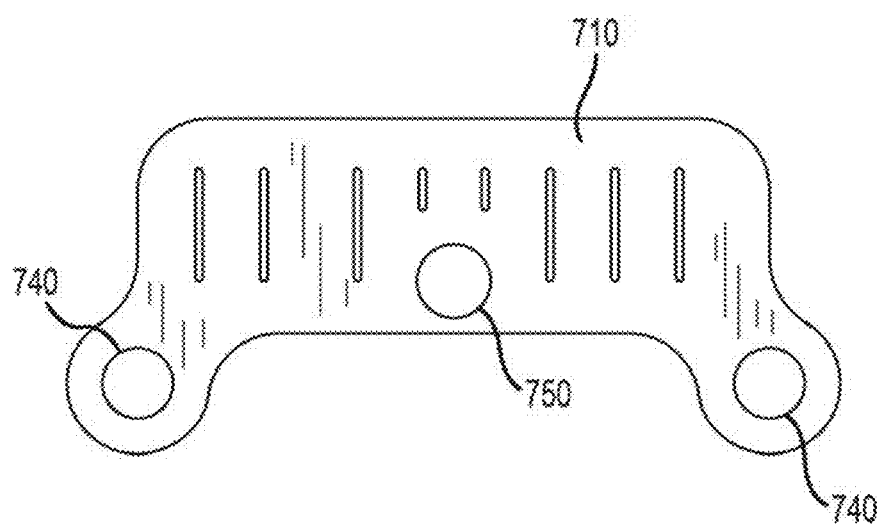
FIG. 7 is a schematic diagram illustrating an example of an optional screen support patch, in accordance with the present disclosure.

FIG. 7 is a schematic diagram illustrating an example of an optional screen support patch. FIG. 7 illustrates one embodiment of a screen support 710, two tensioning connections 740, and a reactor positional locator 750. Although the reactor positional locator 750 is depicted as circular, the shape may be any appropriate shape including, but not limited to, circular, elliptical, square, triangular, trapezoidal, rectangular, oval, and so forth. Similarly, the tensioning connections 740 may be any appropriate shape including, but not limited to, circular, elliptical, square, triangular, trapezoidal, rectangular, oval, and so forth.

One embodiment may include vibration assembly located along the top and/or bottom edges of the screen, as each screen and frame may have specific limitations preventing transducers from being arranged in one configuration on all screens. The vibrations assembly may be located at the top, bottom, and/or sides of the screen, or any combination thereof. In some cases there may not be sufficient space surrounding the screen on one or more of the sides of the screen. This may also determine which sides the vibration assembly may be located. Also, the type of screen mounting may determine the location(s) of the vibration assembly.

Each transducer can be coupled with one or more magnets, one on each side of the screen and oriented such that the two or more magnets are attracted to one another and sandwich the screen between them. One or more magnets or one larger magnet which may be approximately equivalent to the two or more magnets, can be used to increase the mass, which is driving screen vibration but there should be an equal quantity of magnets on each side to maintain a predictable level of vibration and for the screen to remain centered above the electromagnet.

Mounting patches or screen supports can be adhered to the edges of the screen as illustrated in at least FIGS. 1-3, wherever a transducer is located and serve several purposes. One purpose may be to locate the magnet in space such that the distance from the magnet to the electromagnet remains constant. The screen supports or mounting patches may be designed with a cutout in the center which serves to capture the magnet and restrain its position within approximately 2 inches from the edge of the screen. The magnet may be located in the approximate range of 0.01 to two inches from the edge of the screen. The hole in the screen support for the magnets may also be an indentation or partial cutout. The screen support also helps to increase the effective area of the vibration source by acting as a rigid medium transferring vibration from the localized magnets to a broader area of screen material. Two tensioner connection holes, one on either side of the patch, allow the patch to be tensioned in a convenient way. Sufficient tension is important to prevent the magnet from propagating surface waves that are so big that they no longer despeckle a screen or are visible to the eye. There may be anywhere from one to fifteen tensioner connection holes, or preferably in one embodiment seven tensioner connection holes. The number of tensioner connection holes in the screen support or patch may be high or lower depending on the size of the patch.

The distance between the electromagnet and reactors is of critical importance. As these components are moved closer together, the effectiveness of the despeckling solution may improve until the electromagnet makes contact with the screen or reactors, at which point the solution's effectiveness may drastically decrease. Additionally, moving the reactors further from the electromagnet may reduce the effectiveness of the solution. For this reason, it may be desirable to incorporate some form of adjustment for locating the electromagnet (or whichever part of the transducer is rigidly fixed). The adjustment may allow the user to change the distance between electromagnet and reactor and then lock the position so that it does not change during use. This can be achieved using many methods. One method may be to mount the rigidly fixed portion on a slide whose other portion is rigidly fixed. A locking mechanism such as a set screw may be used to lock the assembly in the desired location. Another solution may be to locate a shim of the correct thickness between the electromagnet or reactor and the rigid armature. Once the shim provides the correct distance between the electromagnet and the reactor, the shim may be removed.

Alternatively it is possible to place transducers along the sides as well as the top and bottom of the screen as needed. A transducer can be made with as little as one magnet on the screen if the electromagnet can be placed and driven such that the excursions or motion out of plane of the screen, of the magnet are not too large. The total screen motion at the transducer, out of the screen plane, for a standard 20 ft×40 feet may be in the approximate range of 3-10 mm, optimally 4 mm in the z-direction or out of the screen plane.

Some screens may be configured so that the screen edges may be wrapped around a pole, pipe, or other slender member for mounting and hanging. This may help to maximize screen area since the frame exists behind and within the screen. This frame style may employ a different method for mounting the transducer because a clear edge on the screen may not be available on which to mount the reactors.

Figure 8:
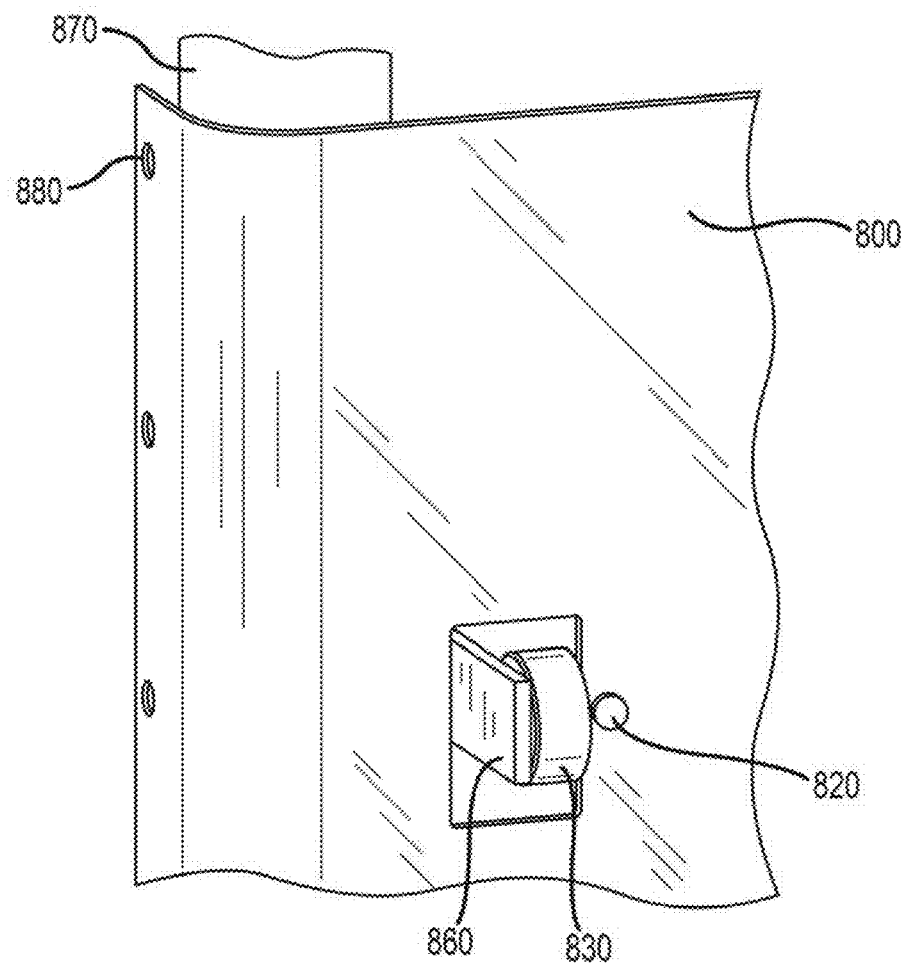
FIG. 8 is a schematic diagram illustrating a mounting configuration for wrapped screens, in accordance with the present disclosure.

FIG. 8 is a schematic diagram illustrating a mounting configuration for wrapped screens and shows the configuration for mounting a transducer on a screen with wrapped edges. A small section of screen may be removed to allow the electromagnet to be positioned such that it is directly in line with the screen material. The electromagnet may be supported by a bracket attached to the screen frame. FIG. 8 illustrates the front of a screen 800 wrapped around a frame pipe 870 and secured using the screen mounting holes 880.

In FIG. 8, the electromagnet 830 may be mounted to a rigid armature 860 which may be then connected to the screen frame or frame pipe 870 or other rigid location with the purpose of supporting the electromagnet 830 in a rigid fashion. Reactors 820 may be located on the screen using the same method and mounting orientation, with respect to the transducer location and orientation, as the preferred mounting method illustrated in FIG. 2.

The magnets may be from United Nuclear Scientific and may be round Neodymium magnets rated at Grade N45 whose diameter are 0.5" and thickness are 0.125". Comparable magnets that are similar to those described may also be used. Several of the described magnets may be used simultaneously by stacking them on each other in order to increase the mass driving screen vibration. Additionally, high strength magnets of other shapes and sizes could also be employed with similar success. Medium or low strength magnets, as well as any reactor made from ferrous material can also be used though design specifications may be considerably tighter in order to achieve success. High strength magnets may be any grade N40 neodymium magnet or above, or multiples of magnets that may be equivalent to a grade N40 neodymium magnet or above. Medium or low strength magnets or any other ferrous material may be any magnet or ferrous material with any field strength of less than that of a grade N39 neodymium magnet.

The appropriate electromagnet may seek a balance between strength and cost. One electromagnet may have a holding force between approximately 1 Kg-100 Kg when directional current (DC) of manufacturer indicated voltage is applied. Some electromagnets for cinema screens may have a DC holding force range of approximately 10-80 Kg. Magnets between the approximate range of 0.1 to 1000 Kg force can be used depending on screen size and composition.

In practice, a complex signal of appropriate voltage may be used to drive the electromagnet and thus vibrate the screen. The power supply range may be approximately 12 Volts to 48 Volts. The electromagnet may be mounted on the end of a rigid armature which is rigidly connected to the screen frame so that minimal vibrational energy is lost through the frame and vibrational energy to the screen is maximized. The armature may be made of steel, aluminum, or plastic, or any other appropriate material that when the assembly is in use, the armature may maintain less than approximately ⅛ inch motion in any direction. Alternatively the electromagnet can be fixtured directly to the wall, floor, and/or ceiling to hold static while still maintaining appropriate distance to the reactors. The preferred electromagnets may have some means for fixturing to the armature. Appropriate electromagnets may be Uxcell electromagnets. Further, the electromagnets may be DC 12V 40 Kg/400N Lift Holding Electric Solenoid Electromagnet 49 mm×21 mm electromagnets though any other electromagnets of the same power and form may be used. Other appropriate electromagnets may also include, but are not limited to, fast-switching AC electromagnets with laminated steel cores to minimize eddy-current losses. One such example may be electromagnet RE05-2 which is produced by Magnetech Corp. DC-current electromagnets may also be used but will operate with inherent inefficiencies which make them less desirable for the application.

Figure 9:
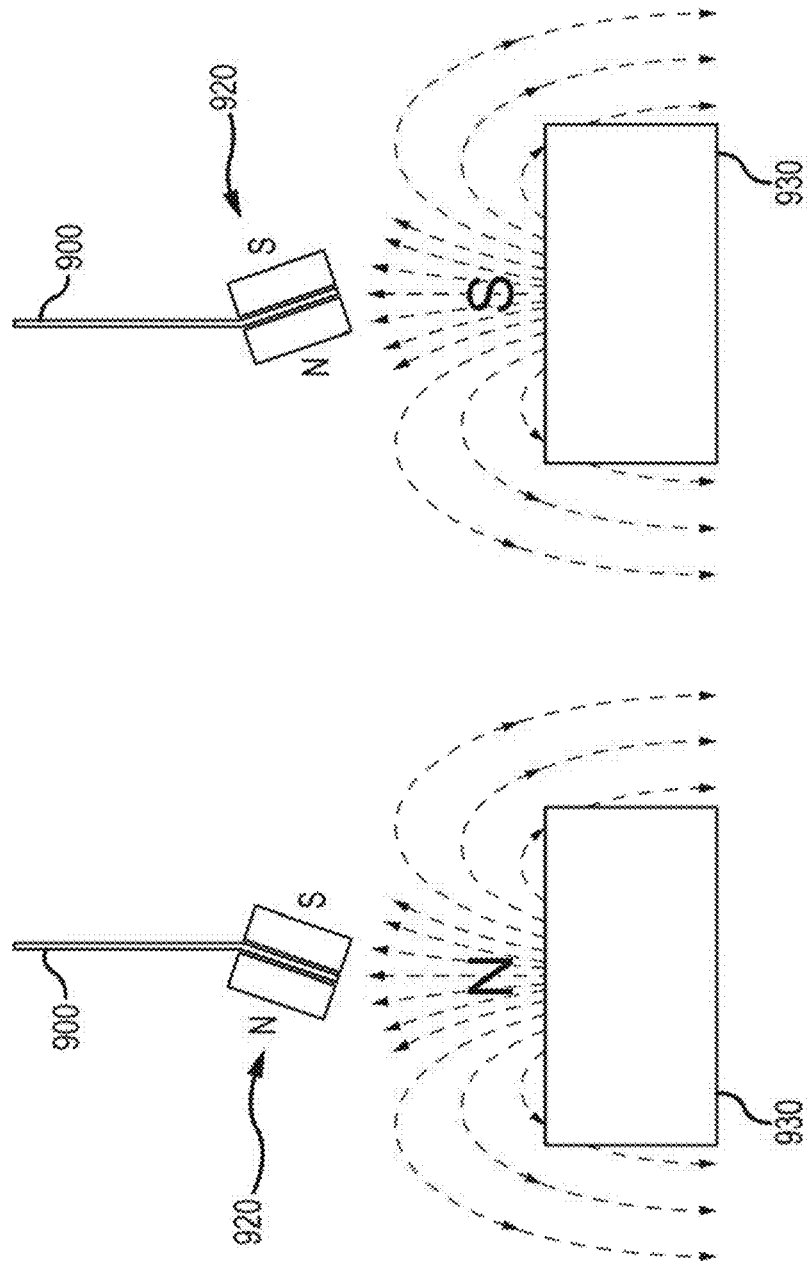
FIG. 9 is a schematic diagram illustrating a depiction of induced motion due to alternating electromagnetic fields, in accordance with the present disclosure.

Using an AC signal to drive the electromagnet generates a constantly reversing electromagnetic field in the area which the high-strength magnets on the screen may be located. FIG. 9 depicts the effects of this electromagnetic field on the magnets which are connected to the screen. FIG. 9 is a schematic diagram illustrating a side view depiction of induced motion due to alternating electromagnetic fields. FIG. 9 includes the screen 900, the electromagnet 930, and the reactor or magnet 920. The movement of the magnets in response to polarity changes of the electromagnet may generate vibration in the screen.

The spacings between the electromagnet, screen edge, and magnets are crucial. Preferred conditions exist when the electromagnet is as close to the edge of the screen as possible while still being fully fixtured in place. Further, the magnets should be placed as close to the screen edge, and therefore to the electromagnet, as possible. Realistic limitations may deviate from optimal and for sufficient operation, the electromagnet should preferably be within approximately 2 inches from the screen edge and reasonably within approximately 12 inches of the screen edge. Screen support patches can be applied to the screen such that the bottom edge of the patch is coplanar with the bottom edge of the screen. The bottom edge of the screen support may be above the bottom of the tensioning connections located in the screen support. Magnet location may be controlled by the design of the screen support patch, which may place the magnets within approximately 2 inches of the screen edge. It is possible to locate the magnet off the screen entirely. For example, by using stiff plastic patches, the patch can extend off the screen edge and the magnets located on the patch so that the screen support may not be in direct contact with the screen.

Transducers may typically be spaced from approximately 1 foot to 60 feet from one another to provide an acceptable level of despeckling. Redundant transducers may be spaced closer, for example, less than approximately one foot.

Figure 10:
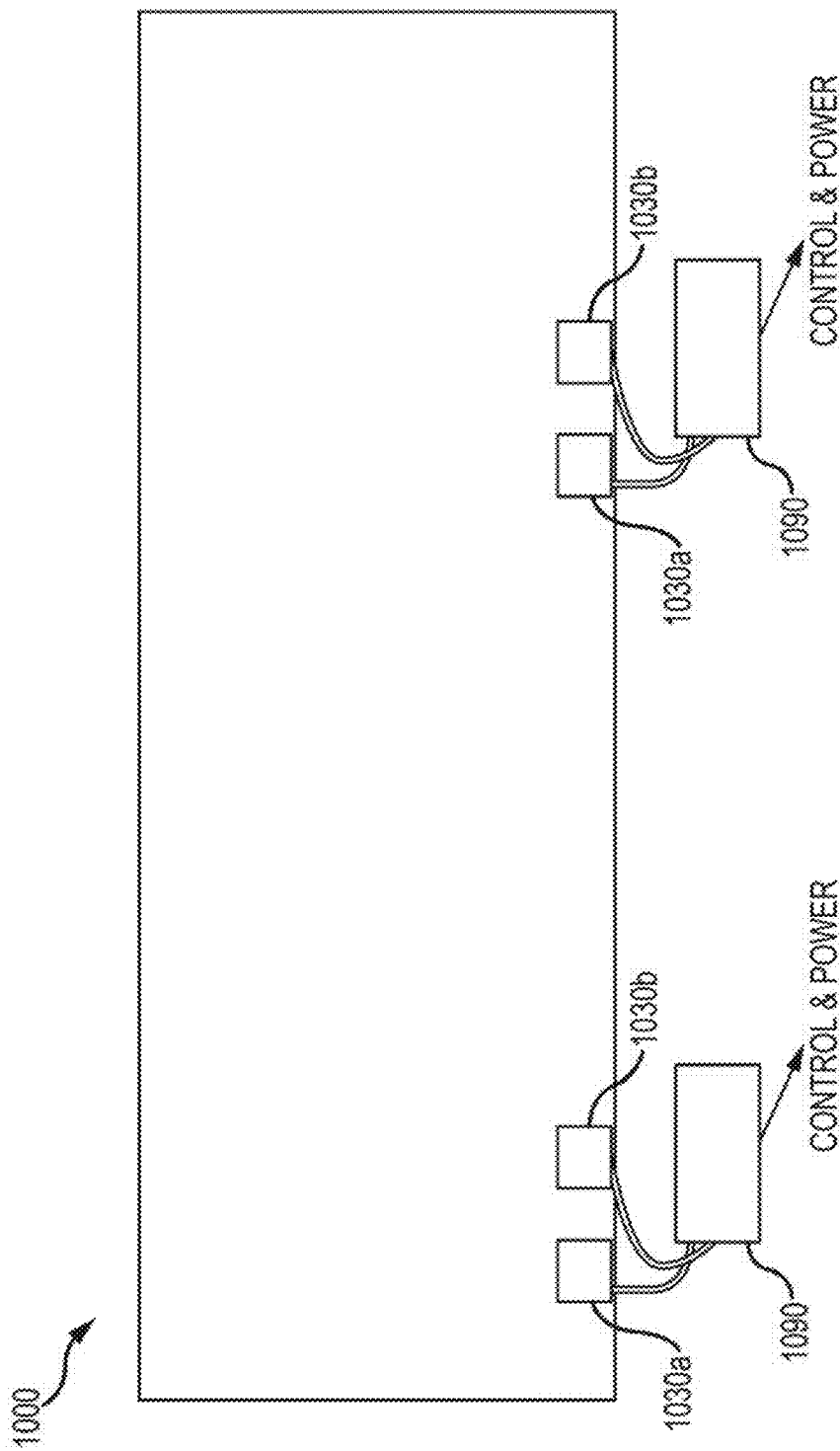
FIG. 10 is a schematic diagram illustrating another configuration of a despeckling solution with redundancy, in accordance with the present disclosure.

A system of vibration devices includes drive electronics and transducers. The drive electronics can drive one transducer each or many transducers. The drive electronics and/or transducers can be controlled by the theater automations system and may be turned off over night or between shows. The electronics can also detect failures of transducers by vibration sensing or by sensing short and/open conditions. In particular, drive electronics can drive at least two transducers in which one transducer is used and the other may be employed when the first transducer has failed. The second transducer is redundant and this system can greatly increase the overall system reliability. FIG. 10, below, shows an example of a system with redundancy. FIG. 10 is a schematic diagram illustrating another configuration of a despeckling solution with redundancy. FIG. 10 includes a screen 1000, drivers 1090, and transducers 1030a and redundant transducers 1030b. Again the combination of transducer and redundant transducer can be replicated along the top and bottom of the screen as well as the sides as needed to achieve reliability and despeckling design specifications.

Figure 11:
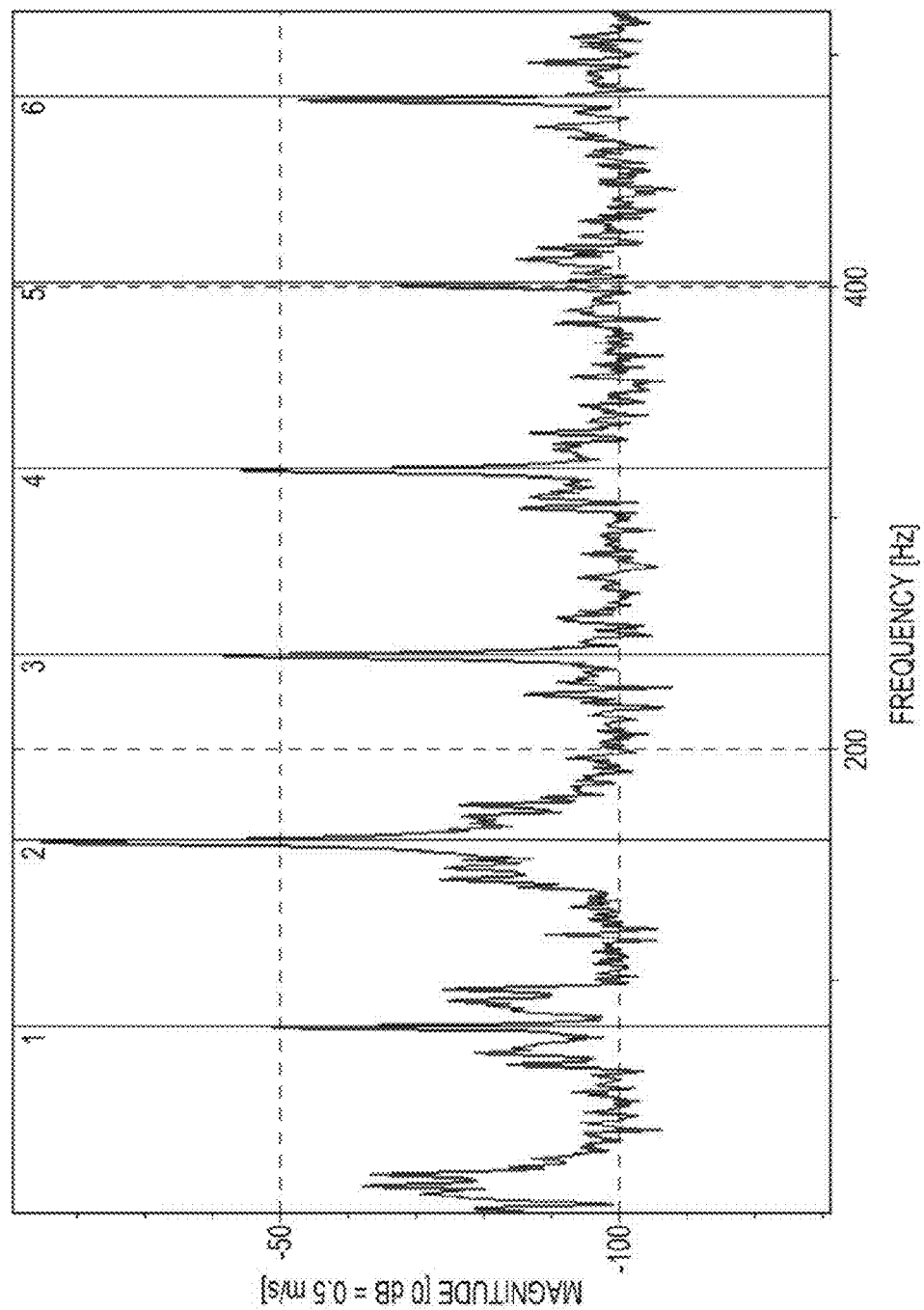
FIG. 11 is a graph illustrating a spectrum of screen vibration using a mechanical transducer, in accordance with the present disclosure.

Using a spinning motor or voice coils as exciters with single tone driver signals results in excitations that are single frequency dominated or harmonic dominated, such as a sinusoidal wave form. FIG. 11 is a graph illustrating a spectrum of screen vibration using a mechanical transducer. Further, FIG. 11 shows pictures of frequencies generated in the screen when using a weighted, off-axis, spinning motor.

Mechanical excitation of a screen with good propagation characteristics can give rise to standing waves, with their associated "nodes" of little or no displacement. These regions of low displacement show visible speckle, and these regions of speckle are manifest in a pattern that depends on the details of the wave propagation across the screen. Small differences in seam structure or attachment mechanics appears to lead to a complex standing wave pattern. In addition, screen vibration can cause audible noise. Vibrations that are close to single frequencies or harmonics of near single frequencies, such as sinusoidal waveforms, may despeckle the screen.

Higher frequencies are easier to hear and therefore not as desirable. Lower frequencies have difficulty inducing waves that are fast enough to eliminate speckle and can cause beating effects with certain projector sources. The embodiments described herein are capable of providing reduced speckle using frequencies in the range of approximately 20-2000 Hz and can be used with preferred frequency range of approximately 30-700 Hz. These frequencies induce motion in the screen that is harder to see, and better averages the speckle patterns, and so is more effective at mitigating speckle visibility.

There are two methods to reduce these problems. The first method is to excite the screen with a more complex vibration spectrum. A range of frequencies provides, in effect, a collection of overlapping patterns of high and low displacement, so that all regions of the screen have enough motion to remove visible speckle.

Figure 12:
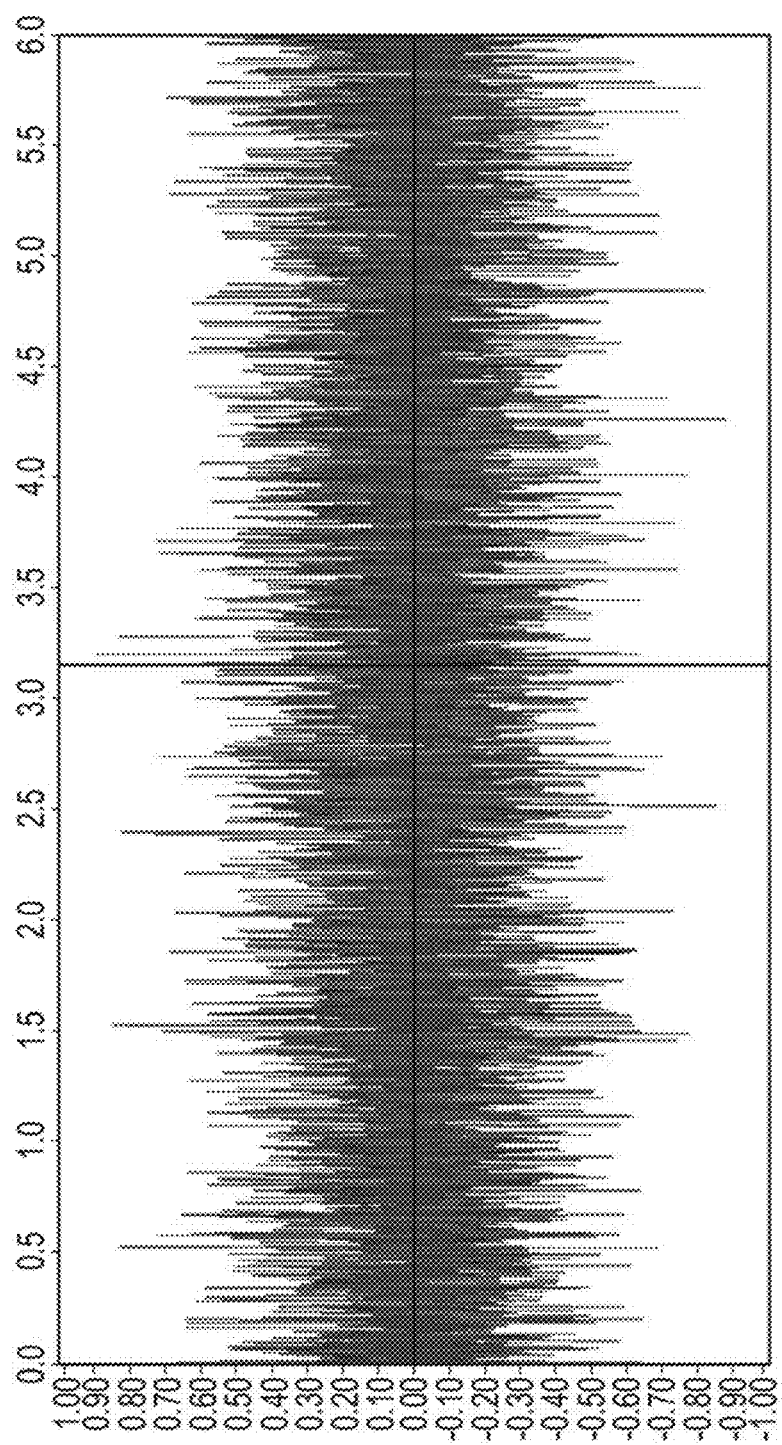
FIG. 12 is a graph illustrating an excitation signal with 500 Hz high frequency cutoff, in accordance with the present disclosure.

FIG. 12 is a graph illustrating an excitation signal with approximately 500 Hz high frequency cutoff. Further, FIG. 12 shows the driving signal of a source that was tailored to have a range of desired high and low frequencies while still incorporating both high and low frequency cutoffs to eliminate undesirable frequencies at the high and low extremes. This spectrum was one of many used in experiments and was effective, for that particular screen configuration, at reducing the visibility of speckle over the whole screen area without causing objectionable audible noise, as generally discussed in commonly owned U.S. patent application Ser. No. 14/298,633, "System and method for vibrating screens to reduce speckle," filed Jun. 6, 2014, which is herein incorporated by reference in its entirety.

A key issue addressed herein, was determining the range of frequencies that may be effective in removing visible speckle without causing excessive audible sound or visible surface waves. One way of accomplishing this is to start with broad spectrum "white" or "pink" noise and then to adjust high and low pass filters in software or hardware while monitoring the response of the screen. This concept of driving the transducers with a bandpass limited signal is described in U.S. patent application Ser. No. 14/298,633, "System and method for vibrating screens to reduce speckle," filed Jun. 6, 2014, which is herein incorporated by reference in its entirety. The noise source may be from analog electronics or may be a pseudo-random noise stream from a computer program. For experimental purposes, a noise stream was created in Matlab, and then the acoustic filter values in Sony Vegas were experimentally varied until a satisfactory result was achieved. Again, anything from sine waves to white or "pink" noise may be used.

A partial solution for reducing standing waves and visible wave reflections includes making the screen termination damped to attenuate reflections of travelling waves from the edge of the screen. Thus, elastomeric bands or damped springs may be preferred mounting hardware. Alternatively, energy absorbing structures, such as foam or rubber pieces, can be incorporated into the mounting hardware.

A critically important aspect of the embodiments described herein may be the potential for significant reduction of noise generated by the despeckling solution. Any transducer located on the screen may make some level of noise and movie theaters can be very quiet. Approximately 25 dBm has been measured in commercial theaters between shows with no audience. Approximately 30-35 dBm can be achieved in full theaters. Practical transducer types including voice coil, motor, and mechanical transducers can easily generate greater than 35 dBm worth of noise when measured 10 ft from the screen, which is the approximately equivalent distance from the screen to the front row seats in most theaters.

It has been experimentally shown that a voice coil solution providing acceptable despeckling emits in the approximate range 40-55 dBA at approximately 10 ft from the transducer without sound muffling in place. In similar tests using this embodiment, acceptable despeckling has been achieved while emitting in the approximate range of 25-40 dBA without sound mufflers in place. This represents a significant reduction in noise generated by the despeckling solution when compared to voice coils. These sound pressure levels (SPL) were calculated after mathematically removing background noise from the environment using the following equations:

$$SPL_{solution} = 10 * \text{LOG}^{(I_{observed} - I_{background})/(1*E^{-12})}$$

$$I_{observed} = (1 * E^{-12}) * 10^{\left(\frac{SPL_{observed}}{10}\right)}$$

$$I_{background} = (1 * E^{-12}) * 10^{\left(\frac{SPL_{background}}{10}\right)}$$

$SPL_{solution}$ is the sound pressure level of the despeckling solution in dBA, $I_{observed}$ is the sound intensity level of the solution and testing environment, $I_{background}$ is the sound intensity level of the testing environment, $SPL_{observed}$ is the sound pressure level of the solution and testing environment, and $SPL_{background}$ is the sound pressure level of the testing environment.

Experimental data was collected using the A-weighting scale for sound pressure levels because it is the weighting most closely associated with the range of human hearing and therefore the most applicable to design constraints.

These despeckling solutions may in practice be equipped with a protective cover to reduce or eliminate the possibility of accidental or intentional tempering. The most likely time for tampering with the despeckling equipment may be during routine theater cleaning and maintenance, in which the screen, frame, transducer, or all three, may be bumped and thus, misaligned. An enclosure may encase the system for protection. One such design is depicted in FIGS. 13 and 14.

Figure 13:
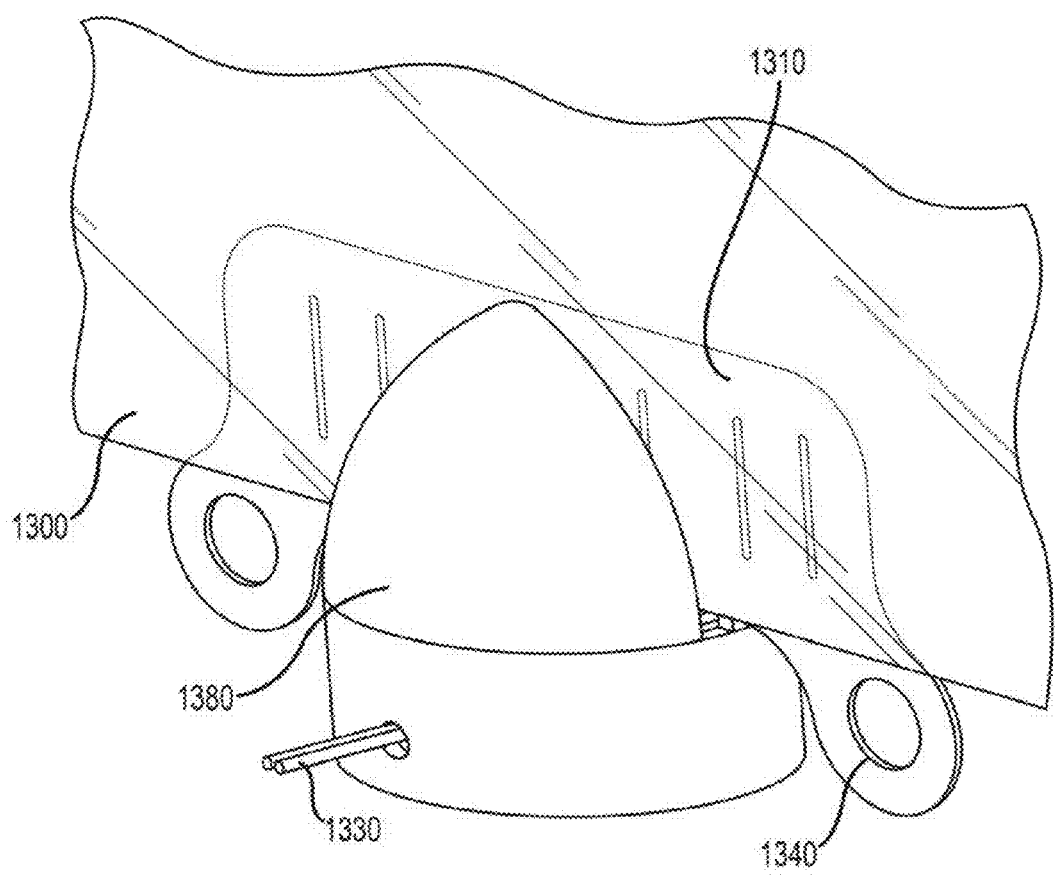
FIG. 13 is a schematic diagram illustrating a protective transducer enclosure, in accordance with the present disclosure.
Figure 14:
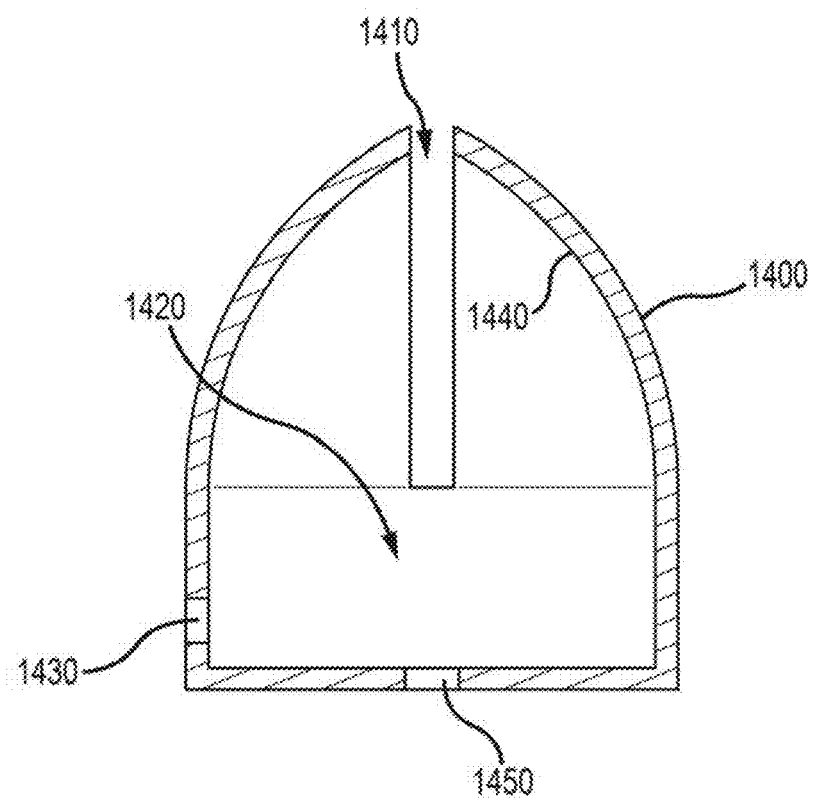
FIG. 14 is a schematic diagram illustrating a cross-section view of the protective transducer enclosure, in accordance with the present disclosure.

FIG. 13 is a schematic diagram illustrating a protective transducer enclosure and FIG. 14 is a schematic diagram illustrating a cross-section view of the protective transducer enclosure. Of primary importance is that the enclosure protects the electromagnet and reactors from bumps or bangs in order to approximately maintain alignment and functionality. An added benefit is that the enclosure may help to reduce noise output of the despeckling solution. This benefit is substantially improved if the enclosure contains provisions for sound dampening, such as acoustical foam or rubber.

FIG. 13 includes a screen 1300, a screen support 1310, tensioning connections 1340, an electromagnet 1330, and an enclosure 1380. As shown in FIG. 13, the reactor and the electromagnet may be enclosed by the enclosure 1380.

FIG. 1400 includes an enclosure 1400, a slot for screen 1410, an electromagnet cavity 1420, an electromagnet wire exit 1430, a surface for acoustic absorption 1440, and a mounting hole 1450.

An important advantage of the embodiments described herein, is the absence of moving mechanical parts which, with prolonged use, tend to be the leading failure point of other screen-based despeckling solutions. The reactors described in this document do in fact move with the vibrating screen though their performance and lifetime are not noticeably impacted by motion. Unlike other despeckling solutions whose entire transducer is mounted on the screen surface, the embodiments described herein do not expose the screen to direct heat or electrical current. This can be helpful for meeting safety regulations regarding movie theater screens. Other solutions that mount entirely on the screen such as a voice coil or motor expose the screen to both thermal and electrical loads and therefore may increase regulatory scrutiny due to the potentially higher risk of fire.

Fundamentally, vibration is an excellent mechanism for initiating and propagating cracks or tears. It is often used for testing the resilience of a material against initiating and propagating cracks or tears. Unfortunately this mechanism works as a disadvantage to the lifetime of screens that are vibrated to reduce speckle. This issue may be even more apparent in the configuration of a screen wrapped around the frame, in which a section of screen material has been cut out to allow an electromagnet to mount in plane with the screen as in FIG. 8. In all of these situations, a very effective method for reducing the likelihood of initiating and propagating a crack or tear is to place some form of edge protection on all edge of the screen. Edge protection exists in the form of some adhered material that supports screen edges and also dampens vibration energy in the localized regions near screen edges. Embodiments as simple as packing tape, or as complex as polycarbonate strips, have all proven effective at reducing the likelihood of a crack or tear initiating or propagating on the screen As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method for reducing speckle on a projection screen, comprising:
  locating a transducer near a projection screen; and
  attaching a first reactor to the projection screen and proximate to the transducer so that the first reactor is operable to vibrate the projection screen to reduce speckle in a viewing area of the projection screen, wherein the first reactor is located in the approximate range of 0.01 inches to 2 inches from an edge of the projection screen.

2. The method for reducing speckle on a projection screen of claim 1, wherein locating a transducer near the projection screen further comprises, attaching the transducer to a rigid structure.

3. The method for reducing speckle on a projection screen of claim 1, further comprising driving the transducer with an alternating current.

4. The method for reducing speckle on a projection screen of claim 1, further comprising vibrating the projection screen such that the range of screen motion out of the screen plane approximately at the transducer is in the approximate range of 3-10 millimeters.

5. The method for reducing speckle on a projection screen of claim 1, further comprising attaching a mounting patch close to at least one edge of the projection screen, wherein the first reactor is located in a reactor position locator in the mounting patch.

6. The method for reducing speckle on a projection screen of claim 2, wherein attaching the transducer to a rigid structure, further comprises attaching the transducer to a projection screen frame.

7. The method for reducing speckle on a projection screen of claim 2, wherein the transducer exhibits less than approximately $1/8$ inch motion in any direction when driving the first reactor.

8. The method for reducing speckle on a projection screen of claim 5, further comprising attaching a second reactor to the first reactor.

9. A vibration system for a projection screen, comprising:
  an electromagnet assembly operable to induce movement in a first reactor, wherein the first reactor is adjacent to a screen support patch, further wherein the screen support patch is adjacent to a projection screen, wherein the first reactor is located in the approximate range of 0.01 inches to 2 inches from an edge of the projection screen.

10. The vibration system for a projection screen of claim 9, wherein the screen support patch has a reactor position locator for locating the first reactor.

11. The vibration system for a projection screen of claim 9, wherein the first reactor is a magnet.

12. The vibration system for a projection screen of claim 9, wherein the first reactor is a ferrous material.

13. The vibration system for a projection screen of claim 9, wherein the electromagnet assembly is located in the approximate range of 0.01 inches to 2 inches from an edge of the projection screen.

14. The vibration system for a projection screen of claim 9, wherein the electromagnet assembly further comprises a rigid armature that at least partially encases the electromagnet.

15. The vibration system for a projection screen of claim 9, wherein at least one edge of the screen support patch is approximately aligned with at least one edge of the projection screen.

16. The vibration system for a projection screen of claim 9, wherein the screen support patch further comprises at least one connection hole located beyond the edge of the screen.

17. The vibration system for a projection screen of claim 9, wherein the electromagnet and the first reactor are located at least at the bottom edge of the projection screen.

18. The vibration system for a projection screen of claim 9, wherein the electromagnet and the first reactor are located in the approximate range of 0.01-5 inches from each other.

19. The vibration system for a projection screen of claim 10, further comprising a second reactor located adjacent to the first reactor, wherein the first and second reactors attach to one another through the reactor position locator in the screen support patch.

20. The vibration system for a projection screen of claim 11, wherein the magnet further comprises a neodymium magnet rated at grade N45.

21. The vibration system for a projection screen of claim 11, wherein the magnet further comprises a neodymium magnet rated in the approximate grade range of N40-N52.

22. A method for reducing speckle on a projection screen, comprising:
  employing an electromagnet in the approximate range of 0.01 inches to 2 inches from an edge of the projection screen;
  driving the transducer with an alternating current signal;
  vibrating the projection screen substrate with a ferrous material that is driven by the transducer to reduce speckle in the viewing area of the projection screen.

* * * * *